UNITED STATES PATENT OFFICE.

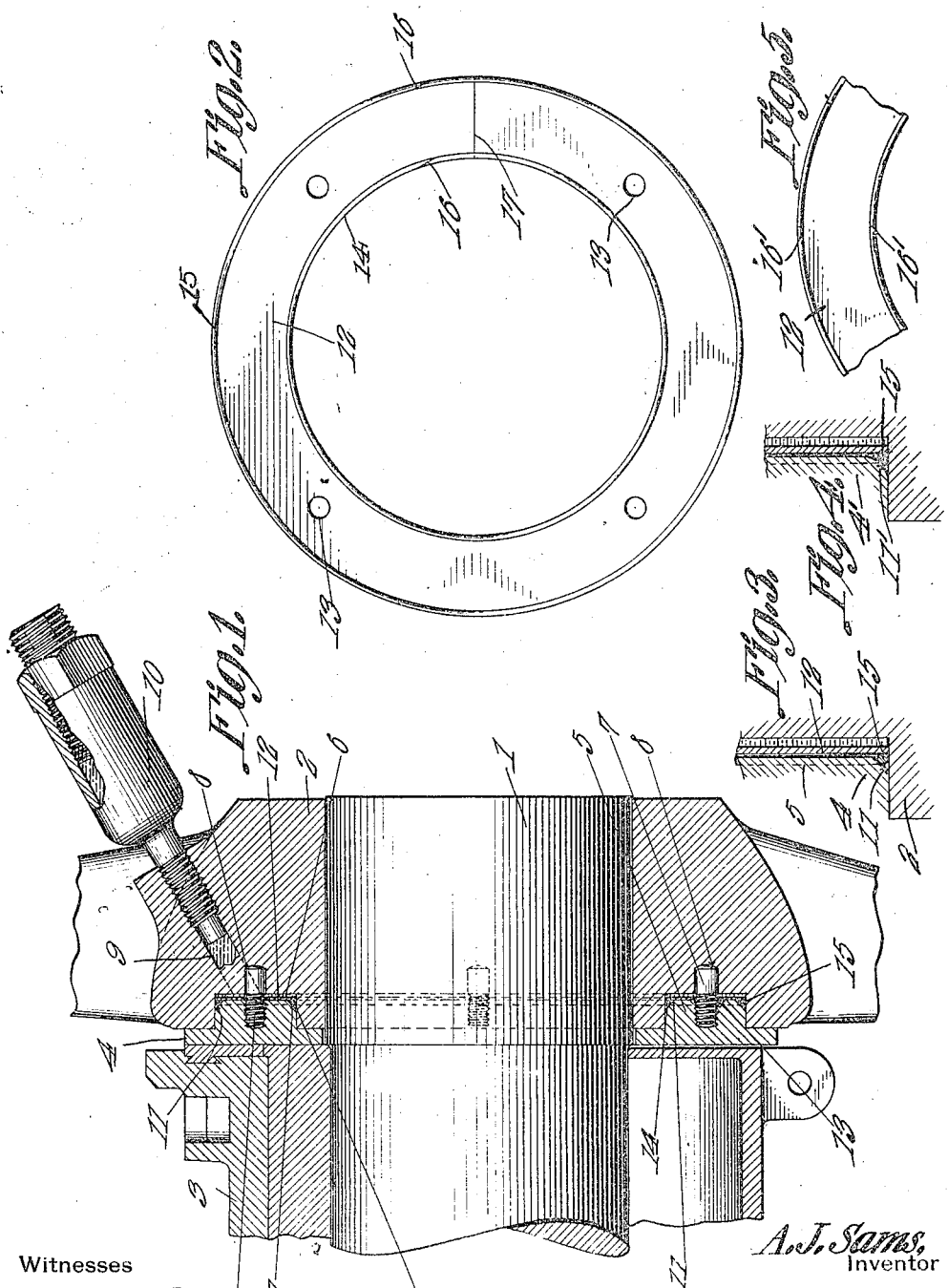

ALBERT J. SAMS, OF FORT SCOTT, KANSAS, ASSIGNOR TO SMITH LOCOMOTIVE ADJUSTABLE HUB PLATE COMPANY, OF PITTSBURG, KANSAS.

PACKING DEVICE FOR HUB-PLATES.

1,143,142.

Specification of Letters Patent. Patented June 15, 1915.

Application filed November 13, 1914. Serial No. 871,962.

*To all whom it may concern:*

Be it known that I, ALBERT J. SAMS, a citizen of the United States, residing at Fort Scott, in the county of Bourbon and State of Kansas, have invented a new and useful Packing Device for Hub-Plates, of which the following is a specification.

The present invention appertains to hub plates for locomotive driving wheels, such as disclosed in Patent No. 920,094, issued April 27, 1909, and aims to provide a novel and improved packing device for the hub plate.

This invention contemplates the provision of a simple and inexpensive packing device for hub plates, the device being of novel construction to enable the same to be readily applied to the hub of the locomotive driving wheel and hub plate, and to enable the device to most effectively serve its intended purpose.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in its preferred embodiment in the accompanying drawing, wherein—

Figure 1 is a sectional view of a locomotive wheel hub having the present attachment applied thereto. Fig. 2 is a plan view of the present device. Fig. 3 is an enlarged sectional detail illustrating one of the packing rings. Fig. 4 is a view similar to Fig. 3 illustrating a slight variation. Fig. 5 is a fragmental view illustrating the packing rings having a modified form of joint.

In the drawings, there is delineated, a locomotive driving axle 1, having a hub 2 of the locomotive driving wheel secured upon the end thereof, the axle 1 being journaled within the driving box or journal bearing 3, and an annular hub plate 4 being interposed between the hub 2 and driving box 3 around the axle 1. This hub plate 4 is provided with an annular rib 5 fitting snugly within an annular recess or groove 6 formed in the inner side of the hub 2. Dowel pins 7 are threaded into the outer side of the hub plate 4, in the rib 5 thereof, and project into sockets 8 provided in the hub, to prevent the hub plate 4 from rotating with respect to the hub 2. The hub 2 is also provided with a diagonal grease duct or passage 9 extending from the bottom of the recess or chamber 6, to an exterior point, and a grease injector or filling cup 10 is engaged to the outer end of the duct or passage 9 for injecting or forcing grease, or its equivalent, into the recess 6 behind the hub plate 4, to force the hub plate against the driving box 3, and to thereby take up the lateral strain in an effective manner, and provide a cushion between the locomotive wheel hub and driving box.

The present invention involves a packing device for closing the space or gap between the hub plate 4 and the walls of the recess 6, for preventing the escape of the grease or lubricant, and to thereby effectively maintain the cushion between the hub and hub plate.

In carrying out the invention, the corners of the rib 5 of the hub plate are beveled or chamfered, as at 11, adjacent the circular walls of the recess 6, and an annular sheet metal gasket 12 is fitted snugly within the recess 6, between the bottom thereof and the hub plate, whereby the gasket 6 is adapted to rest against the outer side of the hub plate. The gasket 12 is provided with apertures 13 for the passage of the dowel pins 7, which will also prevent the gasket from rotating within the recess 6. Disposed between the beveled or chamfered portions 11 and the edge portions of the gasket 12, are the resilient packing rings 14 and 15, respectively, which are adapted to engage the inner and outer circular walls of the recess 6. The packing rings 14 and 15 are preferably formed from wire or similar stock of circular cross section, although stock of another cross section may be employed, if desired. The packing rings are of sufficient cross sectional area to contact simultaneously with the beveled or chamfered portions of the hub plate, the walls of the recess 6 of the hub, and the adjacent face of the gasket 12. It is also preferably to form the packing rings from copper wire, or other soft metal. The packing rings are provided with the lap joints 16 for enabling the packing rings to expand and contract slightly, without allowing appreciable leakage.

It is evident, from the foregoing, taken in connection with the drawing, that the present device may be readily and inexpensively applied to the hub plate and hub, whereby when the grease is injected into the recess 6, it will force the gasket 12 inwardly, to provide the grease cushion between the bottom of the recess 6 and the gasket 12, and the gasket 12 being forced inwardly will bear against the hub plate and force the hub plate yieldably against the driving box or bearing 3. Thus, the lateral strain is taken up and cushioned in the manner of the device disclosed in the said patent, *supra*. The grease in forcing the sheet metal gasket 12 inwardly, will cause the packing rings 14 and 15 to be carried against the beveled or chamfered portions 11, whereby the inner packing ring 14 will be contracted snugly against the inner circular wall of the recess 6, while the outer packing ring 15 will be expanded against the outer circular wall of the said recess, to effectively close the spaces or gaps between the hub plate and walls of the recess 6. This will prevent the escape of the grease in a most thorough and practical manner.

The rings 14 and 15 being split or divided, may be readily snapped over the axle, and the gasket 12 may be split or divided as at 17, for enabling it to be snapped or sprung over the axle, if the gasket cannot be applied when the wheel and axle are separated. As suggested in Fig. 4, the corners of the hub plate 4' may be rounded as at 11', for the engagement of the packing rings, and as illustrated in Fig. 5, the ends 16' of the packing rings may be filed square to abut against each other.

Having thus described the invention, what is claimed as new is:

1. In a device of the character described, a hub having an annular recess, an annular hub plate fitting within the said recess, an annular gasket disposed in the recess between the bottom thereof and the hub plate, and a packing ring disposed between the gasket and hub plate to contact with one wall of the recess.

2. In a device of the character described, a hub having an annular recess, an annular hub plate fitting within the said recess, an annular gasket disposed in the recess between the bottom thereof and the hub plate, and packing rings disposed between the gasket and hub plate and contacting with the circular walls of the said recess.

3. In a device of the character described, a hub having an annular recess, an annular hub plate fitting within the said recess, an annular gasket disposed in the recess between the bottom thereof and the hub plate, and a resilient packing ring disposed between the gasket and hub plate and contacting with one wall of the recess, one of the second and third mentioned parts being provided with means for forcing the packing ring against the said wall of the recess when the gasket is pressed toward the hub plate.

4. In a device of the character described, a hub having an annular recess, an annular hub plate fitting within the said recess, an annular gasket disposed in the recess between the bottom thereof and the hub plate, a resilient packing ring disposed between the gasket and hub plate and contacting with one wall of the recess, and one of the second and third mentioned parts having a beveled portion for the contact of the packing ring when the gasket is pressed toward the hub plate and thus to force the packing ring against the said wall of the recess.

5. In a device of the character described, a hub having an annular recess, an annular hub plate fitting within the said recess and having beveled portions, an annular gasket fitted within the said recess, and resilient packing rings arranged between the said beveled portions and the gasket to contact with the circular walls of the recess when the gasket is pressed toward the hub plate.

In testimony that I claim the foregoing as my own, I have hereto affixed my signature in the presence of two witnesses.

ALBERT J. SAMS.

Witnesses:
HARRY L. ROGERS,
A. A. MELLETTE.